United States Patent [19]

Wootton

[11] Patent Number: 5,471,361

[45] Date of Patent: Nov. 28, 1995

[54] VEHICLE WHEEL SENSORS, AND METHOD OF CONVERTING A SINE WAVE SIGNAL IN A COUNTING OR MEASURING DEVICE

[75] Inventor: Frederick M. J. Wootton, Ventnor, England

[73] Assignee: Westland Aerospace Limited, United Kingdom

[21] Appl. No.: 915,542

[22] Filed: Jul. 20, 1992

[30] Foreign Application Priority Data

Jul. 20, 1991 [GB] United Kingdom ............ 9115709

[51] Int. Cl.⁶ .................................................. H01H 47/00
[52] U.S. Cl. ................................................ 361/236; 307/106
[58] Field of Search ................................. 361/236, 238, 361/239, 242; 307/106, 107

[56] References Cited

U.S. PATENT DOCUMENTS

| | | | |
|---|---|---|---|
| 3,808,543 | 4/1974 | Mueller | 328/38 |
| 4,121,112 | 10/1978 | Hartig | 307/106 |
| 4,143,538 | 3/1979 | Karsh et al. | 361/236 |
| 4,238,692 | 12/1980 | An et al. | 307/106 |
| 4,280,165 | 7/1981 | Pospelov et al. | 361/236 |
| 4,551,662 | 11/1985 | Ishida | 318/316 |

FOREIGN PATENT DOCUMENTS

| | | |
|---|---|---|
| 1203685 | 9/1970 | United Kingdom . |
| 1487295 | 9/1977 | United Kingdom . |
| 2046446 | 11/1980 | United Kingdom . |
| 2134265 | 8/1984 | United Kingdom . |

Primary Examiner—Jeffrey A. Gaffin
Attorney, Agent, or Firm—Larson & Taylor

[57] ABSTRACT

A vehicle wheel speed sensor has a rotor 11 provided with a series of circumferentially spaced rotor elements 12 mounted on a wheel axle 10. A sensor 13 mounted on a relatively non-rotatable support is influenced by passage of the rotor elements to output a sine wave signal. The sine wave signal is fed for processing to an interface unit 15 on the vehicle and pulses are generated at at least two predetermined phases of each cycle of the sine wave. A method of producing marker pulses by detecting the zero cross-over points and the peaks and troughs of a sine wave signal, and generating a marker pulse at each zero cross-over point and at each peak and trough of the sine wave signal is also described.

3 Claims, 3 Drawing Sheets

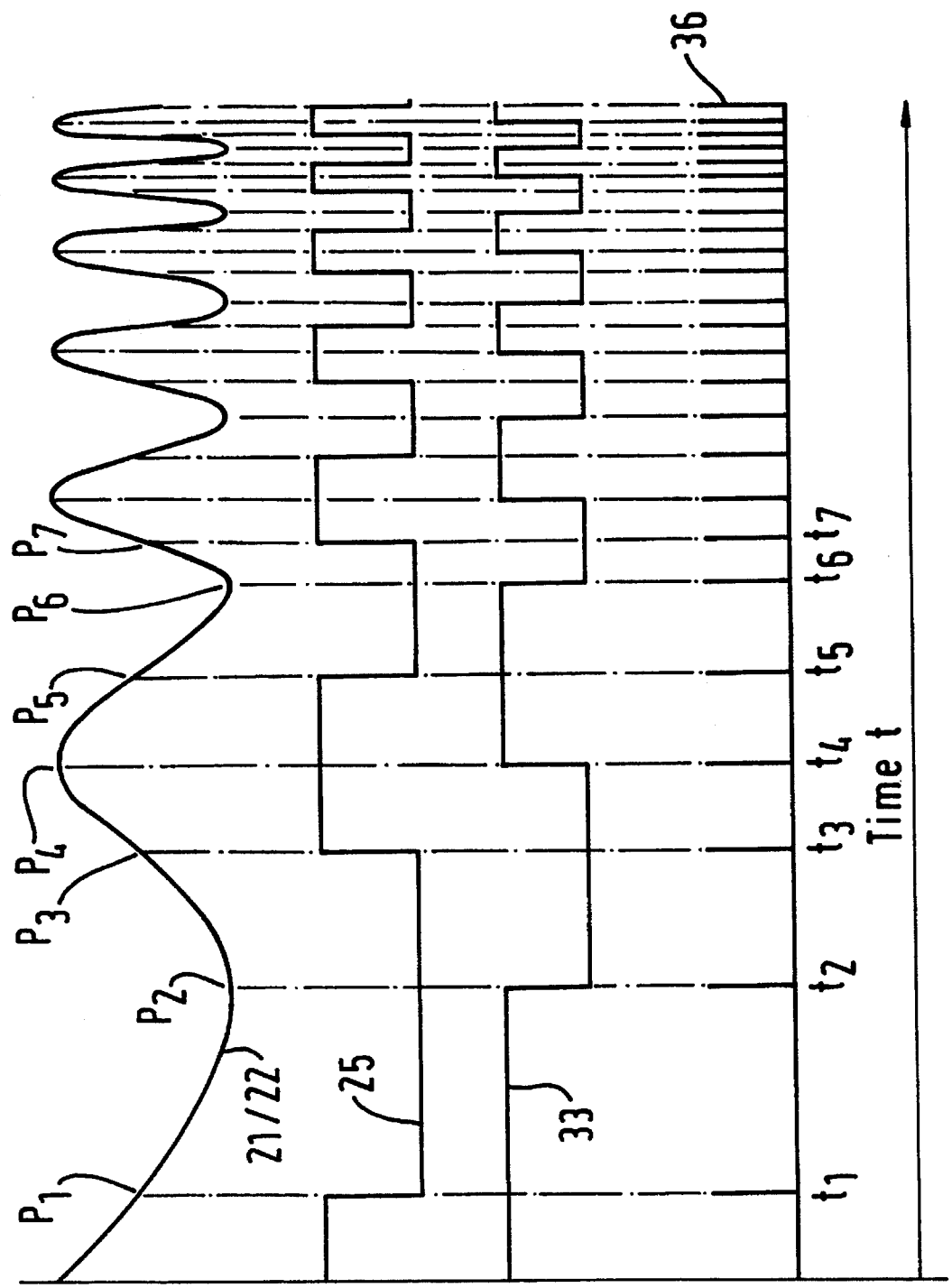

VEHICLE WHEEL SENSORS, AND METHOD OF CONVERTING A SINE WAVE SIGNAL IN A COUNTING OR MEASURING DEVICE

BACKGROUND OF THE INVENTION

1. Field of the Invention

This invention relates in one aspect to vehicle wheel speed sensors particularly, but not exclusively, to wheel speed sensors for aircraft, and in a second, more general aspect to a method of converting a sine wave signal into a sequence of marker pulses, the marker pulses being produced for each quadrant of the sine wave signal.

2. Description of the Prior Art

Aircraft wheels are often provided with wheel speed sensors, generally in the form of a tachometer mechanically driven by the wheel axle. The tachometer may be used to provide a speed signal to an anti-lock braking means associated with the wheel. The hostile axle environment imposes strong demands upon the tachometer. Heat, dust and vibration are all encountered.

Wheel speed sensors are known in cars which comprise a toothed rotor associated with a car wheel, and a stationary inductive sensing means responsive to movement of the teeth past the sensing means.

With an aircraft it is desirable to be able to monitor accurately the aircraft wheel speed even at very low wheel speeds, such as 10 rpm. If a toothed or segmental rotor were to be used in conjunction with a conventional pulse counting circuit to count cycles of the sine wave generated by an inductive sensing means, a large number of teeth or segments, hereinafter referred to as 'rotor elements', would need to be provided on the rotor. Since the room for such a rotor adjacent to the axle is strictly limited, a larger number of rotor elements results in a smaller circumferential spacing between the elements. For a given dimension of inductive sensing means a smaller spacing between the rotor elements produces a reduced amplitude of the sine wave signal output since even a small sensing means tends to be influenced by several adjacent rotor elements.

Also, when a large number of rotor elements, such as 150 on a rotor of diameter 6.35 cm (2.5 inches), is attempted there is an increased requirement for close tolerance machining, and the slightest variation in the air gap between the sensing means and the rotor elements introduces spurious signals into the system.

SUMMARY OF THE INVENTION

It is an object of the present invention to provide a vehicle wheel speed sensor which facilitates the use of a reduced number of rotor elements while providing an accurate wheel speed assessment.

This object is met by a vehicle wheel speed sensor comprising a rotor adapted to be associated with the wheel for rotation therewith, and sensing means adapted to be mounted adjacent to the rotor on a relatively non-rotatable support. The rotor is provided with a series of circumferentially spaced rotor elements adapted to influence the sensing means by a non-contact method, and signal processing means for processing a substantially sine wave output, or fundamental component of the output, from the sensing means. The signal processing means comprises a pulse generating means arranged to generate pulses at at least two predetermined phases of each cycle of the sine wave output of the sensing means.

Thus the invention provides a signal processing means arranged to produce pulses at a plurality of different points in a cycle of a sine wave generated by the sensing means.

The zero cross-over points of the sine wave output can be detected by employing a squaring amplifier to convert the sine wave into a square wave, the edges of the square wave corresponding to the zero cross-over points of the sine wave, and those edges can then be used to generate pulses.

The pulse generating means preferably comprises a peak and trough detection means arranged to detect the peaks and troughs of the sine wave and to generate a pulse for each peak and trough encountered.

When the zero cross-over points as well as the peaks and troughs are arranged to be detected, four pulses are generated for each cycle of the sine wave.

A preferred peak and trough detection means comprises means for deriving from the sine wave signal first and second slightly phase-shifted sine wave derivatives, and comparator means arranged to compare the amplitudes of the first and second derivatives and to produce a pulse when the amplitudes of the derivatives are substantially equal.

While it would be possible for one of the derivatives to be in phase with the sine wave signal, it is preperred to phase-shift the derivatives by substantially equal amounts in opposite senses with respect to the sine wave signal, whereby the times at which the amplitudes of the derivatives are found to be equal correspond substantially to the central positions of the troughs and peaks of the sine wave.

Thus, a pure sine wave would produce four precisely equally spaced pulses per cycle if the wheel is rotating at a constant speed. If, on the other hand, the speed of the wheel is changing, then the pulse spacing between the last two pulses will represent an up to date measure of the current wheel speed, which will be different from the preceding spacing of the pulses.

This is distinct from the effect that would be achieved by using a frequency multiplier to multiply the frequency of the sine wave signal, since a change in wheel speed could then only be detected after a complete cycle of the parent sine wave signal.

It is another object of the invention to provide a method of converting a sine wave signal generated by a counting or measuring device into a sequence of marker pulses, the marker pulses being produced for each quadrant of the sine wave signal.

This object of the invention is et by a method of producing marker pulses from a sine wave signal in a counting or measuring device which comprises the steps of detecting the zero cross-over points of the sine wave signal, detecting the peaks and troughs of the sine wave signal by deriving from the sine wave signal first and second phase-shifted sine wave derivatives and comparing the amplitudes of the derivatives, and generating a marker pulse at each zero cross-over point and at each occasion on which the amplitudes, of the derivatives are found to be equal.

A further object of the present invention is the provision of a method of measuring the rotational speed of a rotating object.

This further object is met by a method comprising the steps of measuring the rotational speed of a rotating object, comprising the steps of:

a. sensing passage of a series of circumferentially spaced elements located on the rotating object past a location that is fixed with respect to the rotating object;

b. generating a sine wave signal from the sensed passage of the elements;

c. detecting the zero cross-over points of the sine wave signal;
d. detecting the peaks and the troughs of the sine wave signal by deriving from the sine wave signal first and second phase-shifted sine wave derivatives and comparing the amplitudes of the derivatives; and
e. generating a marker pulse at each zero cross-over point and at each occasion on which the amplitudes of the derivatives are found to be equal.

BRIEF DESCRIPTION OF THE DRAWINGS

An aircraft wheel speed sensor in accordance with the invention will now be described, byway of example only, with reference to the accompanying drawings, in which:

FIG. 3(a–d) are plots of various signals in the circuit of FIG. 1, and

DETAILED DESCRIPTION OF THE DRAWINGS

Figure 1:
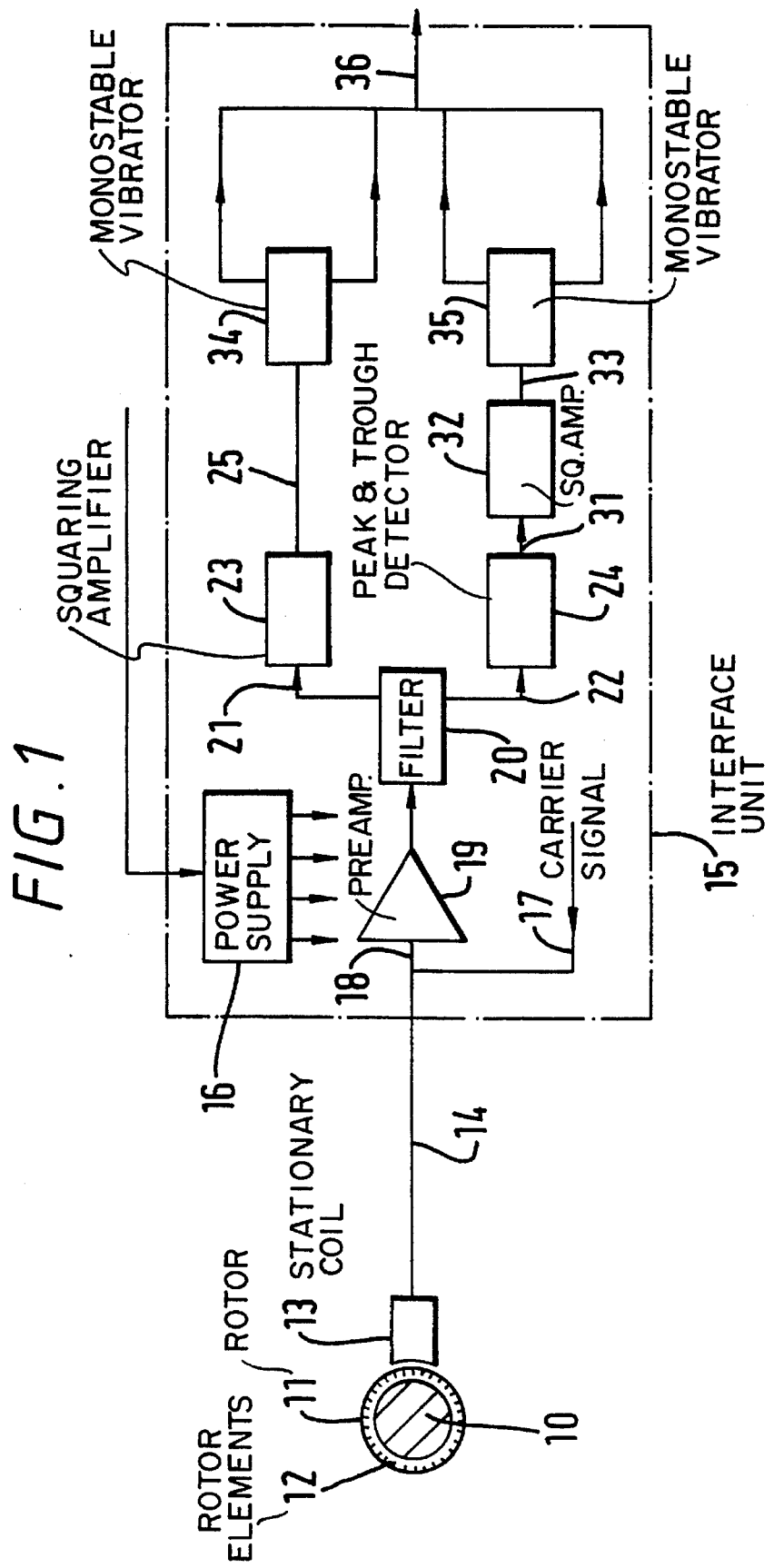
FIG. 1 is a block circuit diagram of the sensor.

With reference to FIG. 1, the axle 10 of an aircraft wheel (not shown) is fitted with a coaxial rotor 11 incorporating a series of circumferentially equally spaced metallic elements 12 which are capable of being inductively sensed by a stationary coil means 13 mounted on a relatively fixed part of the axle support (not shown). The metallic elements may, for example, take the form of teeth or of individual ferromagnetic members, such as mumetal strips, fixedly mounted in a non-metallic annular carrier. The diameter of the rotor 11 is typically 6.35 cm (2.5 inches).

The coil means 13 may take various forms. Generally the coil means will comprise a coil mounted on a metallic former. The former may be of flat E-shape with the limbs of the E directed radially inwards towards the rotor, and the plane of the E extending radially of the rotor. The coil is preferably mounted on the central limb of the E.

The reluctance of the magnetic circuit formed between the former and the rotor elements changes in known manner as the elements pass the former.

The coil means 13 is connected wiring 14 to a remote interface unit 15 positioned away from the hostile environment of the wheel axle and energized by a stabilized power supply 16.

The coil is excited by a carrier signal 17 which is conveniently derived from a signal source used for a tire pressure indicating system (TPIS) associated with the same wheel. In this case the carrier signal 17 is at 31.25 kHz. The source impedance of the carrier signal 17 is high, and the load circuit formed by the coil of the coil means 13 is capacitatively tuned to a point close to resonance.

The output signal 18 from the coil means 13 comprises the carrier signal modulated by a sine wave which results from the change in reluctance between the coil means 13 and the rotor 11 as the wheel rotates. As the wheel driven rotor 11 turns the carrier waveform is modulated by a sine waveform which is proportional to wheel speed. The resultant output signal 18 is $$\frac{\text{RPM} \times N}{60} \text{ Hz}$$

where N is the number of rotor elements.

The output signal 18 is fed to a pre-amplifier 19 and then to a filter 20 which removes the carrier signal to provide in-phase sine wave signals 21, 22 to a squaring amplifier 23 and to a peak and a trough detector unit 24 respectively.

FIG. 3(a) shows a plot of the sine wave signals 21, 22 as the wheel accelerates. The output of the squaring amplifier 23 is shown in FIG. 3(b), the edges of the resulting square-wave signal 25 at the output of amplifier 23 being produced at times $t_1$ and $t_3$, $t_5$ and $t_7$, etc. corresponding to the zero cross-over points $P_1$, $P_3$, and $P_5$, $P_7$ of the sine wave signal.

Figure 2:
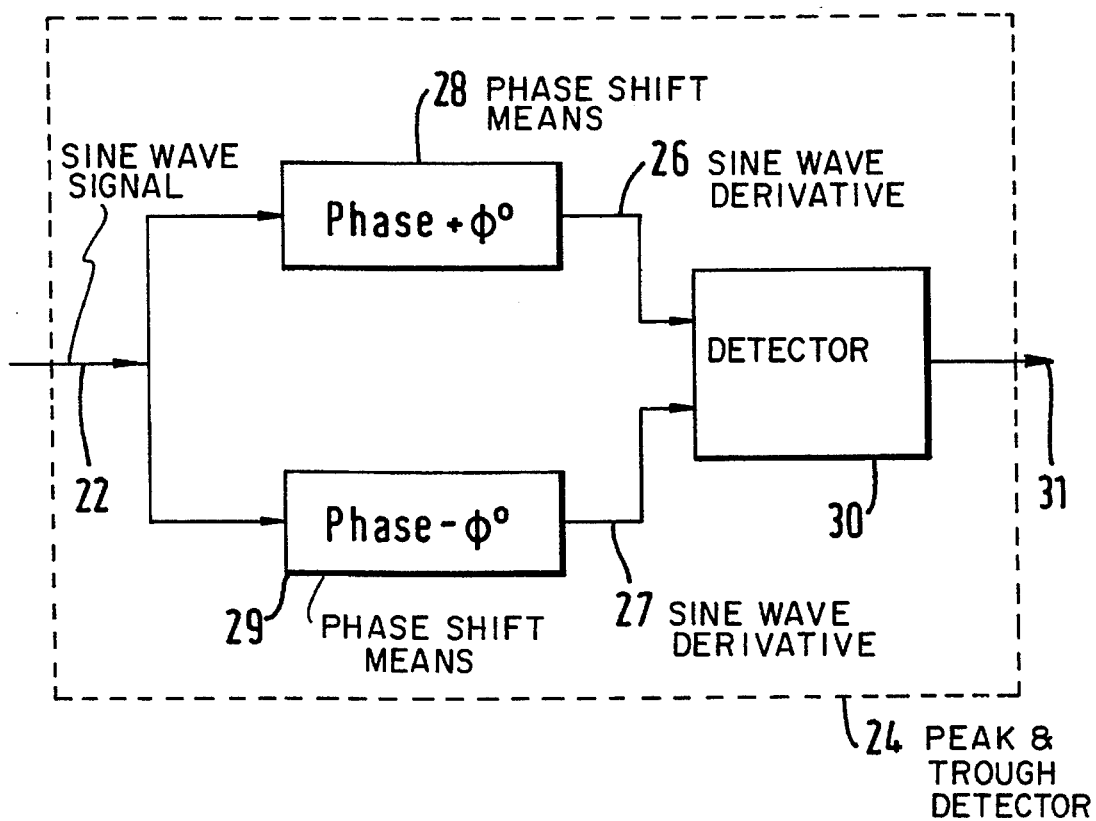
FIG. 2 is a more detailed block circuit diagram of the peak and trough detector unit employed in the circuit of FIG. 1.
Figure 4:
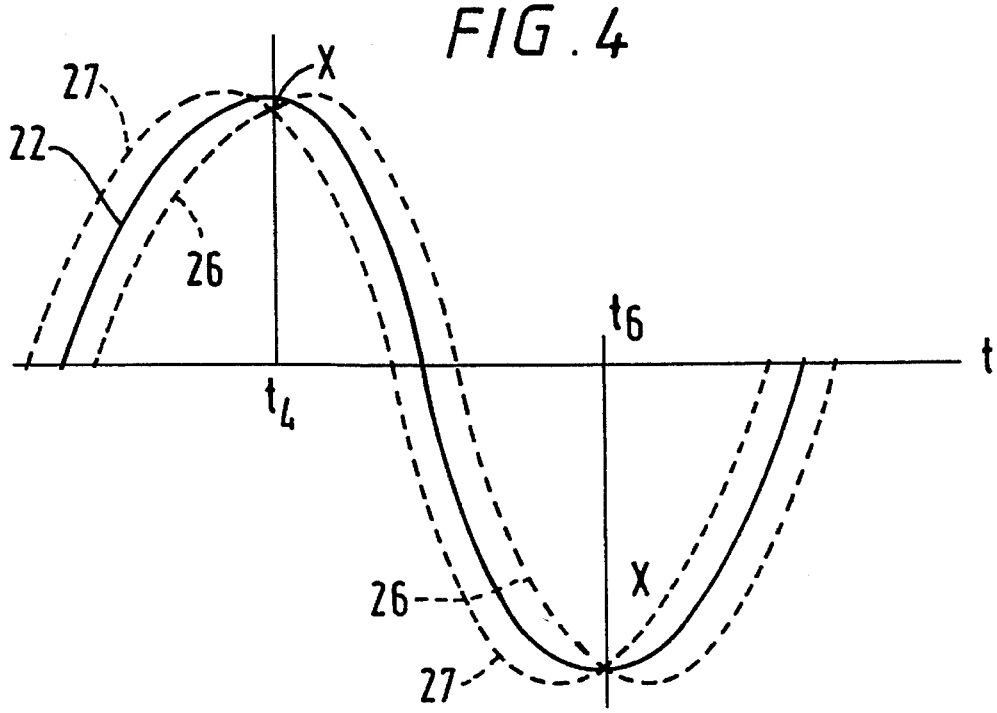
FIG. 4 is a plot of the phase-shifted sine wave derivatives present in the unit of FIG. 2.

The peak and trough detector unit 24 is shown in FIG. 2. The sine wave signal 22 is used to produce first and second sine wave derivatives 26 and 27 which are phase-shifted relative to each other as shown in FIG. 4. Preferably, as shown the derivatives 26 and 27 are phase shifted, by phase shift means 28, 29 respectively, by equal and opposite amounts $\phi$, relative to the parent sine wave signal 22. The cross-over points (reference FIG. 4) between the derivatives 26 and 27 are detected by a zero crossing detector 30. That is, the detector 30 detects the instants at which the amplitudes of the derivatives 26, 27 are equal, and since the derivatives are symmetrically disposed with respect to the sine wave signal 22, the cross-over points X coincide precisely in time with the peaks and troughs of the sine wave signal 22, as at times $t_4$ and $t_6$ (reference FIG. 4).

In a less preferred modification, only one of the derivatives 26, 27 is phase-shifted with respect to the signal 22.

The output 31 of the unit 24 is fed to a squaring amplifier 32 to provide the square wave signal 33 of FIG. 3(c) where the edges of the square wave, such as at times $t_2$ and $t_4$, coincide with the troughs and peaks, as at $P_2$ and $P_4$. The square wave signal 33 is 90° out of phase with signal 25.

The square wave signals 25 and 33 are used to trigger respective dual monostable multivibrators 34 and 35 whose outputs are combined to produce an output pulse train 36, FIG. 3(d), in which there is a pulse for each zero cross-over point of the sine wave 21 and a pulse for each trough and for each peak of the sine wave signal 21.

The pulses may be counted against time to derive wheel speed by feeding the pulse train to a standard frequency counter which opens a gate, say for one second, and counts the number of pulses coming through. Alternatively, in an aircraft application the pulse train may be fed to an aircraft on-bard computer for further processing.

To save weight the rotor 11 may conveniently be combined with a rotating transformer provided as part of a wheel TPIS.

The system described is capable of monitoring wheel speeds as low as abut three revolutions per minute (RPM).

What is claimed is,

1. A vehicle wheel speed sensor comprising:
   a rotor connected to said vehicle wheel for rotation therewith having a series of circumferentially spaced rotor elements;
   a sensing means mounted adjacent to said rotor on a relatively non-rotatable support for producing a substantially sine wave signal when influenced by said rotor elements;
   a squaring amplifier for converting said sine wave signal into a square wave signal, the edges of the square wave signal corresponding to the zero cross-over points of said sine wave signal;

a peak and trough detection means for detecting the peaks and troughs of said sine wave signal; and a pulse generating means for generating pulses at said edges of said square wave signal and said peaks and troughs of said sine wave signal.

2. A vehicle wheel speed sensor according to claim 1, wherein said peak and trough detection means comprises means for deriving from said sine wave signal first and second slightly phase-shifted sine wave derivatives, and comparator means arranged to compare the amplitudes of said first and second derivatives and to produce a pulse when said amplitudes of said derivatives are substantially equal.

3. A method of measuring the rotational speed of a rotating object, comprising sensing passage of a series of circumferentially spaced elements located on the rotating object past a location that is fixed with respect to the rotating object, generating a sine wave signal from the sensed passage of the elements, detecting the zero cross-over points of the sine wave signal, detecting the peaks and the troughs of the sine wave signal by deriving from the sine wave signal first and second phase-shifted sine wave derivatives and comparing the amplitudes of the derivatives, and generating marker pulse at each said zero cross-over point and at each occasion on which the amplitudes of the derivatives are found to be equal.

* * * * *